United States Statutory Invention Registration [19]

[11] Reg. Number: H325

Mallory, Jr. et al. [43] Published: Sep. 1, 1987

[54] ELECTROLESS DEPOSITION OF TRANSITION METALS

[75] Inventors: Glenn O. Mallory, Jr., Los Angeles; Conrad E. Johnson, Santa Ana, both of Calif.

[73] Assignee: Richardson Chemical Company

[21] Appl. No.: 802,078

[22] Filed: Nov. 26, 1985

Related U.S. Application Data

[63] Continuation of Ser. No. 690,822, Jan. 11, 1985, abandoned, which is a continuation of Ser. No. 479,108, Mar. 28, 1983, abandoned, which is a continuation of Ser. No. 283,872, Jul. 16, 1981, abandoned, which is a continuation of Ser. No. 173,909, Jul. 30, 1980, abandoned.

[51] Int. Cl.[4] ..... C23C 18/38
[52] U.S. Cl. ..... 106/1.23; 106/1.26
[58] Field of Search ..... 106/1.23, 1.26

[56] References Cited

U.S. PATENT DOCUMENTS

| | | | |
|---|---|---|---|
| 3,146,125 | 8/1964 | Schneble, Jr. et al. | 117/212 |
| 3,214,454 | 10/1965 | Blaser et al. | 260/429.9 |
| 3,269,861 | 8/1966 | Schneble, Jr. et al. | 117/212 |
| 3,310,430 | 3/1967 | Schneble et al. | 106/1.23 |
| 3,399,268 | 8/1968 | Schneble, Jr. et al. | 174/68.5 |
| 3,403,035 | 9/1968 | Schneble et al. | 106/1.23 |
| 3,431,120 | 3/1969 | Weisenberger | 101/1 |
| 3,434,866 | 3/1969 | Boggs et al. | 117/47 |
| 3,437,507 | 4/1969 | Jensen | 117/47 |
| 3,442,683 | 5/1969 | Lenoble et al. | 117/47 |
| 3,475,293 | 10/1969 | Haynes et al. | 204/48 |
| 3,650,777 | 3/1972 | Schneble et al. | 106/1.23 |
| 3,708,329 | 1/1973 | Schonenberg | 117/47 R |
| 3,891,568 | 6/1975 | Nishio et al. | 252/181 |
| 4,019,910 | 4/1977 | Mallory, Jr. | 106/1 |
| 4,248,633 | 2/1981 | Heijnen et al. | 106/1.23 |
| 4,301,196 | 11/1981 | McCormack et al. | 106/1.23 |

FOREIGN PATENT DOCUMENTS

| | | |
|---|---|---|
| 1370387 | 10/1974 | United Kingdom . |
| 1407771 | 9/1975 | United Kingdom . |
| 1419613 | 12/1975 | United Kingdom . |
| 1438080 | 6/1976 | United Kingdom . |
| 1247259 | 9/1971 | United Kingdom . |

OTHER PUBLICATIONS

Lunsjatskas–"Chemical Deposition of Nickel–Copper–Phosphorus Platings" Institute of Chemistry and Chemical Technology, Academy of Sciences of the Lit. SSR. Boose–Recent Develop. in Electroless Plating Metal Finishing Guidebook Directory for 1975, 43ed pp. 220–222 and 450–456 (1975).

*Primary Examiner*—John F. Terapane
*Assistant Examiner*—Eric Jorgensen
*Attorney, Agent or Firm*—Lockwood, Alex, FitzGibbon & Cummings

[57] ABSTRACT

Transition metals form a plated deposit in an electroless transition metal plating bath containing an organophosphorus complexing agent selected from the class of compounds having the general formulas:

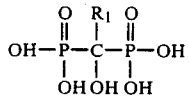

wherein $R_1$ is alkyl having from 1 to 5 carbon atoms, alkali metal and ammonium salts of said compounds, and

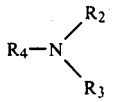

wherein $R_2$ is

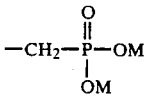

$R_3$ is selected from the class consisting of $R_2$ and $—CH_2CH_2OH$, and $R_4$ is selected from the group consistiong of $R_2$, $—CH_2CH_2OH$, and

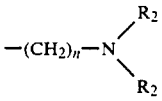

wherein each M is independently selected from the group consisting of H, NH, and alkali metal, and "n" is an integer from 1 to 6 inclusive. These baths have unique properties, including the ability to be formulated to have selected operating pH values within a wide pH range and the ability to operate effectively at the selected pH value.

14 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ELECTROLESS DEPOSITION OF TRANSITION METALS

This application is a continuation of application Ser. No. 690,822, filed Jan. 11, 1985 which is a continuation of application Ser. No. 479,108, filed Mar. 28, 1983 which is a continuation of application Ser. No. 283,872, filed July 16, 1981 which is a continuation of application Ser. No. 173,909, filed July 30, 1980, all subsequently abandoned.

BACKGROUND AND DESCRIPTION OF THE INVENTION

This invention relates generally to improved plating baths for the electroless deposition of transition metals, which baths include a complexing agent belonging to a certain class of organophosphorus compounds, the electroless deposition complexing agent of this invention being especially suitable for use in formulating a variety of baths having a wide range of operating pH values and proceeding by one of a variety of reduction reaction mechanisms. Especially advantageous are those formulations that have a very high operating pH and which avoid the production of noxious ammonia fumes.

Electroless plating techniques have been available for transition metal plating within electroless plating baths, which are well known to be baths wherein the plating is conducted without the application of an external electrical current. Conventional bath additives include agents for complexing the metal ions that are maintained within a particular bath. Some known complexing agents include ethylenediamine tetraacetic acid and its salts, potassium pyrophosphate, polyamines, Rochelle salt, citric acid, and alkali salts of citric acid. Such complexing agents are known in general to form highly soluble and conductive complexes with metal ions present within electroless plating baths, but typically they do not allow for an exceptionally wide range of operating pH values, including both acidic and alkaline operating conditions. Usually, when it is desirable or necessary to operate an electroless plating bath at an especially high pH, often approaching or at 14, even if a conventional complexing agent is included in the bath, it is typically necessary to add ammonium ions thereto, which introduces hazards including the formation of noxious ammonia fumes as the bath is operated and the ammonium ions themselves when the bath waters are disposed of as wastewater.

It has now been discovered that electroless deposition of transition metals can be readily and easily achieved within a wide range of operating pH values, including both acidic and highly alkaline values, when such baths include therewithin an organophosphorus compound falling within a certain class. These organophosphorus compounds can be characterized generally as phosphonates that exhibit complexing properties with respect to transition metal ions within transition metal electroless plating baths. By the employment of these organophosphorus compounds within transition metal electroless plating baths, the baths may be adjusted to operate at a pH value suitable for the particular substrate being plated so as to provide transition metal plating baths having greater flexibility than heretofore typically realized.

Additional desirable results include the ability to run a highly alkaline bath without having to add ammonium ions as well as the ability to operate an electroless transition metal bath, particularly an electroless copper deposition bath, at an acidic operating pH in order to take advantage of features usually associated with acidic baths when compared with alkaline baths, such as the ease with which the bath is buffered, increased hardness of the deposits, and enhanced control of the stability of the baths. Baths not including complexing agents in accordance with this invention, particularly electroless nickel plating baths, often are not stable to the addition of potassium or sodium as potassium hydroxide or sodium hydroxide, usually eliminating these compounds from the group of bases suitable for raising the pH of such baths to extremely high operating levels, thereby typically reducing the group of suitable bases to only ammonium hydroxide. Electroless transition metal plating baths having complexing agents in accordance with this invention are stable to the addition of either sodium or potassium as the hydroxide thereof.

These results are basically achieved in accordance with the present invention through the utilization of certain organophosphorus compounds within electroless transition metal plating baths which can be formulated with transition metals that plate autocatalytically, such as nickel, cobalt, iron, platinum, paladium, gold and silver, or with those transition metals that do not plate autocatalytically, such as copper, which generally plate only by substitution or displacement and require a substrate different from that of the metal being deposited.

Accordingly, an object of this invention is to provide an improved electroless plating bath and method which enable the electroless plating of transitional metal over a wide pH range.

Another object of this invention is to incorporate an organophosphorus complexing agent into transition metal electroless plating baths, which baths can be formulated to operate at a low pH, a high pH, or a pH therebetween and which baths can operate effectively at high pH through the use of bases other than those that generate noxious ammonia fumes or introduce ammonium ions into wastewaters.

Another object of the present invention is to provide and use an electroless bath for plating transition metals such as copper, nickel and cobalt, which baths include an organophosphorus compound of a certain class.

Another object of this invention is to use phosphonates belonging to a certain class of compounds as a complexing agent for an electroless transition metal plating or deposition bath.

These and other objects of this invention will be apparent from the following further detailed description thereof.

The transition metal electroless plating baths of this invention are basically achieved by incorporating thereinto an organophosphorus compound that is a phosphonic acid or derivative thereof, referred to herein as a phosphonate. Organophosphorus compounds of the phosphonate type have been found to exhibit superior transition metal complexing properties for transition metals, whether or not such transition metals exhibit autocatalytic properties within electroless baths.

Phosphonates in accordance with the present invention are selected from the class of compounds having the general formulas:

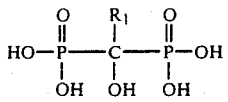

wherein $R_1$ is alkyl having from 1 to 5 carbon atoms, alkali metal and ammonium salts of said compounds, and

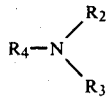

wherein $R_2$ is

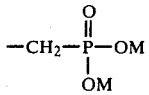

$R_3$ is selected from the class consisting of $R_2$ and $—CH_2CH_2OH$, and $R_4$ is selected from the group consisting of $R_2$, $—CH_2CH_2OH$, and

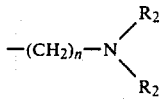

wherein each M is independently selected from the group consisting of H, $NH_4$ and alkali metal, and "n" is an integer from 1 to 6 inclusive. A detailed description of these and other suitable phosphonates is set forth in U.S. Pat. No. 3,214,454 and U.S. Pat. No. 3,336,221, the disclosures of which are incorporated herein by reference.

Examples of specific phosphonates exhibiting these advantageous complexing properties include: aminotri(-methylenephosphonic acid), or nitrilotri(methylenephosphonic acid), and the alkali metal and ammonium salts thereof such as a solution of the pentasodium salt of aminotri(methylenephosphonic acid); 1-hydroxyethylidene-1,1-diphosphonic acid, and the alkali metal and ammonium salts thereof such as the trisodium salt of 1-hydroxyethylidene-1,1-diphosphonic acid; ethylenediamine tetra(methylphosphonic acid), and the alkali metal and ammonium salts thereof such as a solution of the ammonium salt or the potassium salt thereof; and 1,6-diaminohexane tetra(methylphosphonic acid), and the alkali metal and ammonium salts thereof.

Organophosphorus complexing agents in accordance with this invention are incorporated within transition metal electroless plating baths utilizing reducing agents of various types, which reducing agents operate within the particular bath system for the catalytic reduction of transition metal cations within the bath. The reducing agent compounds which may be employed for such purpose include any of those compounds conventionally employed in electroless transitional metal plating baths as reducing agents. Examples of the wide variety of reducing agents suitable for use within baths according to this invention include formaldehyde, phosphite ion generators such as sodium hypophosphite or boron containing compounds such as boron-nitrogen compounds and borohydrides. Typical examples of suitable boron containing reducing agent compounds include lower alkyl substituted amine boranes such as dimethylamine borane and diethylamine borane. Correspondingly, suitable borohydrides include potassium borohydride and sodium borohydride.

The source of transition metal cations in baths in accordance with this invention may include any of the water soluble or semisoluble salts of such metals which are conventionally employed for such plating. Particular examples of sources of copper cations may include cupric and cuprous salts and hydrates thereof such as cupric chloride, copper nitrate, or cupric sulfate. Suitable sources of the nickel cations may, for example, include nickel chloride, nickel sulfamate or nickel sulfate. Cobalt cation sources include salts such as cobalt chloride.

In operating the electroless plating baths in accordance with this invention, an aqueous bath typically is first prepared by adding the bath components to water within a tank, usually one having a heater and passive (non-catalytic) walls. Added are the source of transition metal cation, the complexing agent, and the reducing agent, as well as a pH regulator to adjust the pH to a desired value within a very broad range of possible values, after which a suitable substrate is emersed within the bath whereupon the transition metal is plated or deposited thereupon. The substrate employed for such purpose may be a metal such as aluminium or mild steel or a non-metal such as plastic. Usually when the substrate is a non-metal, it should be surface activated in accordance with established procedures so as to permit the transition metal deposit to form thereon.

Conditions employed in conducting the plating will be dependant upon the desired final concentration of the transition metal to be deposited, the various bath components, the reducing agent employed, the operating pH utilized, the concentration of the transition metal cation, and the temperature of the bath. Accordingly, the conditions as described hereinafter may be varied somewhat within the indicated ranges in order to achieve a variety of different electroless deposits. Typical concentrations of transition metal cations to be maintained within the electroless bath may be varied as desired, but it is a general practice to add and maintain the transition metal cation within ranges which usually vary somewhat depending upon the particular transition metal cation used. For example, copper cation may be maintained in the bath within a general range of from about 0.005 to about 0.5 mol per liter, and a nickel or cobalt cation source might typically be maintained in the bath within range of from about 0.05 to about 0.5 mol per liter.

Concentrations of the complexing agent within any particular bath in accordance with this invention will vary somewhat depending upon the identity and the concentration of the transition metal being complexed, and they will also vary somewhat depending upon the particular complexing agent utilized. Such concentrations will, in general, lie between about 0.001 and about 1 mol per liter, usually between about 0.01 and about 0.5 mol per liter. In many instances the complexing agent concentration will lie within an especially preferred range between about 0.02 and about 0.2 mol per liter.

Reducing agent concentrations used in these baths will be those that are sufficient and cost-efficient for reducing the transition metal cations within the particular bath formulation to their free metal state. Concentration ranges will vary from reducing agent to reducing agent and from bath to bath in accordance with this invention, which ranges will generally lie between about 0.001 and about 1 mol per liter, with suitable ranges usually lying between about 0.007 and about 0.3 mol per liter.

The pH regulator employed for the electroless bath solutions in accordance with this invention can be widely varied depending upon the substrate being plated or deposited upon, whether it is desired to take advantage of the attributes of a highly alkaline plating bath developed with or without ammonium ions, or whether it is desired to produce a bath having the advantages of a rather low pH. In general, the amount of pH regulator added will be determined when a particular desired pH value is reached, rather than upon the concentration of the pH regulator to be added. Typical operating pH ranges can vary between less than 4 and up to a pH of 14. It is particularly significant that efficiently operating pH values at the upper limit can be achieved without the need to use ammonium ions. Suitable pH regulators include acids and strong inorganic bases such as the alkali metal hydroxides including potassium hydroxide and sodium hydroxide. Ammonium hydroxide can also be used when there is no desire to avoid the formation of noxious ammonium fumes.

Bath temperatures maintenance or variation is, in part, a function of the desired rate of plating as well as the composition of the bath, especially the particular reducing agent employed. Typical temperature ranges vary from about room temperature substantially up to the boiling point of the bath system, generally between about 25° to about 100° C. A borane-reduced bath usually will have a temperature between about 25° to about 82° C., a formaldehyde bath is typically in the lower portion of the general temperature range, a borohydride bath will vary in temperature throughout the general range, and a phosphite-reduced bath is best suited for operation within the upper portion of the general temperature range.

Plating times will depend upon such factors as the extent of the plating deposit desired upon the particular substrate being electrolessly plated when combined with the rate of deposition developed by a particular bath. For example, a low pH bath can generally be expected to have a faster rate of deposition than a high pH bath, making the total bath deposition time generally less for a low pH bath than for a high pH bath. The duration of any plating can be adjusted to achieve the desired level of deposit based upon the particular deposition rate of the bath being used.

Any one of the various conventional bath additives may also be employed to achieve a desired end result. Included within such conventional materials are bath stabilizers such as sulfur-containing compounds, for example, thiourea, sulfide ion controllers such as lead, a source of a metal cation different from the source of transition metal cations already within the bath, and various other types of additives such as codeposition enhancers.

Baths in accordance with this invention and the associated use of the particular organophosphorous compounds of this invention offer a wide degree of flexibility both from the point of view that satisfactory transition metal electroless deposition or plating can be accomplished within a wide variety of operating pH values as well as due to the ability to utilize diverse types of reducing agents in order to customize the bath to provide the conditions that are advantageous for plating any one of a wide variety of substrates. As a result, it is possible to prepare an electroless copper bath that is effective at an acidic pH, for example, between about 4 and about 6.5. It is also possible to take advantage of properties generally available when using acidic baths, such as simplified buffering, the ability to improve deposition rates, exceptionally hard deposits, and enhanced bath stability in general. The baths and method of use according to this invention also make possible, with particular regard to nickel electroless plating baths, the ability to replace ammonium hydroxide with a non-noxious pH regulator such as an alkali metal hydroxide, which, without the complexing agents in accordance with this invention, would render such a nickel electroless plating bath unstable.

The following examples are offered to illustrate the baths in accordance with this invention and the procedures that are presently preferred for practicing their method of use. A variety of bath types, as characterized by the particular reducing agent used, are illustrated. Each type of bath incorporated a complexing agent of this invention, and each type was found to deposit satisfactorily.

EXAMPLES 1-8

Several aqueous DMAB reduced electroless baths were prepared using various concentrations of dimethylamine borane reducing agent and various transition metal ions, and the pH of each was adjusted to a desired level. A wide range of operating pH values for these DMAB baths were developed, including very low pH as well as high pH values, while using a variety of organophosphorous complexing agents in accordance with this invention. These formulations are shown in Table I:

TABLE I

| Example No. | DMAB (mols/liter) | Cation Source (mols/liter) | Complexing Agent mols/liter) | pH Regulator | Bath pH | Bath Temp. (°C.) |
|---|---|---|---|---|---|---|
| 1 | 0.09 | $CuSO_4.5H_2O$ (0.1) | HEDP[1] (0.1) | KOH | 10.9 | 25 |
| 2 | 0.09 | $CuSO_4.5H_2O$ (0.1) | EDTMP[2] (0.1) | KOH | 5.0 | 25 |
| 3 | 0.09 | $CuSO_4.5H_2O$ (0.01) | ATMP[3] (0.2) | $NH_4OH$ (1.3M) | 11.5 | 49 |
| 4 | 0.09 | $CuSO_4.5H_2O$ (0.1) | ATMP[3] (0.2) | $NH_4OH$ (1.3M) | 10.7 | 60 |
| 5 | 0.09 | $CuSO_4.5H_2O$ (0.05) | ATMP[3] (0.1) | $NH_4OH$ (1.3M) | 10.5 | 60 |
| 6 | 0.04 | $NiSO_4.6H_2O$ (0.1) | EDTMP[2] (0.05) | KOH | 10.3 | 65 |
| 7 | 0.04 | $Ni^{+2}$ (0.1) | HEDP[1] (0.1) | KOH | 4.8 | 71 |

TABLE I-continued

| Example No. | DMAB (mols/liter) | Cation Source (mols/liter) | Complexing Agent mols/liter) | pH Regulator | Bath pH | Bath Temp. (°C.) |
|---|---|---|---|---|---|---|
| 8 | 0.035 | $Co^{+2}$ (0.1) | HEDP[1] (0.1) | KOH | 5.0 | 71 |

[1]HEDP: Trisodium salt of 1-hydroxyethylidene-1,1-diphosphonic acid.
[2]EDTMP: Ethylenediamine tetra (methylphosphonic acid).
[3]ATMP: Pentasodium salt of aminotri (methylenephosphonic acid).

The deposits of Examples 2 and 6 were analyzed, the compositions being boron 0.022% by weight and phosphorus 1.3% by weight, remainder copper; and boron 2.3% by weight and phosphorus not detected, remainder nickel, respectively.

EXAMPLES 9–11

Formaldehyde-reduced electroless baths were prepared to formulate electroless copper deposition systems having one of various organophosphorous complexing agents in accordance with this invention such that each bath has an alkaline operating pH of 12.5. These are recorded in Table II:

TABLE II

| Example No. | $H_2CO$ (mols/liter) | Cation Source (mols/liter) | Complexing Agent (mols/liter) | pH Regulator | Bath pH | Bath Temp. (°C.) |
|---|---|---|---|---|---|---|
| 9 | 0.23 | $CuSO_4.5H_2O$ (0.1) | HEDP[1] (0.1) | KOH | 12.5 | 38 |
| 10 | 0.23 | $CuSO_4.5H_2O$ (0.1) | EDTMP[2] (0.1) | KOH | 12.5 | 38 |
| 11 | 0.23 | $CuSO_4.5H_2O$ (0.05) | ATMP[3] (0.1) | NaOH | 12.5 | 38 |

Example 11 was analyzed, the composition being phosphorus 1.1% by weight, remainder copper.

EXAMPLES 12–16

Baths incorporating sodium borohydride as a reducing agent for one of several transition metal cations were prepared in order to have a very high operating pH without having to use ammonium ions as, for example, sodium hydroxide. These baths are shown in Table III:

TABLE III

| Example No. | $NaBH_4$ (mols/liter) | Cation Source (mols/liter) | Complexing Agent (mols/liter) | pH Regulator | Bath pH | Bath Temp. (°C.) |
|---|---|---|---|---|---|---|
| 12 | 0.0076 | $CuSO_4.5H_2O$ (0.1) | EDTMP[2] (0.1) | KOH | 14.0 | 25 |
| 13 | 0.0076 | $CuSO_4.5H_2O$ (0.1) | EDTMP[2] (0.2) | KOH | 14.0 | 60 |
| 14 | 0.03 | $CuSO_4.5H_2O$ (0.1) | EDTMP[2] (0.2) | KOH | 14.0 | 49 |
| 15 | 0.04 | $Ni^{+2}$ (0.1) | EDTMP[2] (0.2) | KOH | 14.0 | 90 |

TABLE III-continued

| Example No. | $NaBH_4$ (mols/liter) | Cation Source (mols/liter) | Complexing Agent (mols/liter) | pH Regulator | Bath pH | Bath Temp. (°C.) |
|---|---|---|---|---|---|---|
| 16 | 0.04 | $Co^{+2}$ (0.1) | EDTMP[2] (0.1) | KOH | 14.0 | 90 |

The analyzed deposit composition of Example 14 was boron 0.076% by weight and phosphorus 5.2% by weight, remainder copper.

EXAMPLES 17–18

Baths using sodium hypophosphite as the reducing agent were prepared to have either a very low operating pH or an alkaline operating pH, the make-up of each bath being shown in Table IV:

| Example No. | $NaH_2PO_2.H_2O$ (mols/liter) | Cation Source (mols/liter) | Complexing Agent (mols/liter) | pH Regulator | Bath pH | Bath Temp. (°C.) |
|---|---|---|---|---|---|---|
| 17 | 0.3 | $NiSO_4.6H_2O$ (0.1) | ATMP[3] (0.1) | KOH | 4.8 | 87 |
| 18 | 0.28 | $Co^{+2}$ (0.1) | ATMP[3] (0.05) | $NH_4OH$ | 9.0 | 70 |

Example 17 was analyzed, the composition being phosphorus 5.2% by weight, remainder nickel.

While in the foregoing specification certain embodiments and examples of this invention have been described in detail, it will be appreciated that modifications and variations therefrom will be apparent to those skilled in this art. Accordingly, this invention is to be limited only by the scope of the appended claims.

We claim:

1. In a method for electrolessly depositing copper upon a substrate from a bath which includes in admixture: a source of copper cation, a reducing agent and a complexing agent, and which is characterized by said complexing agent rendering said bath operable through a wide range of pH values between about 4 and about 14, the pH value being selected to be the optimum value for the bath, for the substrate and for a selected one of a variety of reducing agents which is selected from the group consisting of formaldehyde, a hypophosphite compound, a boron-nitrogen compound, a borohydride, and an alkylamine borane, the improvement for electrolessly depositing copper at said wide range of pH values comprising:

including within the electroless copper bath an organophosphorus complexing agent selected from the group consisting of compounds having the general formulas:

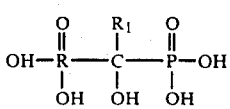

wherein $R_1$ is alkyl having from 1 to 5 carbon atoms, alkali metal and ammonium salts of said compounds, and

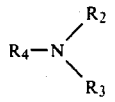

wherein $R_2$ is

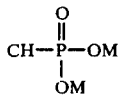

$R_3$ is selected from the class consisting of $R_2$ and $-CH_2CH_2OH$, and $R_4$ is selected from the group consisting of $R_2$, $-CH_2CH_2OH$, and

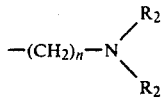

wherein each M is independently selected from the group consisting of H, $NH_4$ and alkali metal, and "n" is an integer from 1 to 6 inclusive; and immersing the substrate within the bath while operating the electroless copper deposition bath at said optimum pH value to maintain optimum deposition conditions for the substrate and for the selected reducing agent.

2. The method of claim 1, wherein said organophosphorus complexing agent is selected from the group consisting of aminotri(methylenephosphonic acid), 1-hydroxyethylidene-1,1-diphosphonic acid, ethylenediamine tetra(methylphosphonic acid), alkali metal and ammonium salts thereof, and combinations thereof.

3. The method of claim 1, further including a pH regulator to adjust the pH of the bath to between about 4 and about 14.

4. The method of claim 1, wherein said organophosphorus complexing agent is present within the range from about 0.001 to about 1 mol per liter.

5. The method of claim 1, wherein said reducing agent is present within the range of from about 0.001 to about 1 mol per liter.

6. The method of claim 1, wherein said source of copper cation is present within the range of from about 0.005 to about 0.5 mol per liter.

7. The method of claim 1, wherein such bath is maintained at a temperature within the range of from about 25° to about 100° C.

8. The method of claim 1, wherein said complexing agent is present within the range of from about 0.01 to about 0.05 mol per liter.

9. The method of claim 1, wherein said complexing agent is present within the range of from about 0.02 to about 0.2 mol per liter.

10. The method of claim 1, wherein said reducing agent is present within the range of from about 0.007 to about 0.3 mol per liter.

11. The method of claim 1, wherein said source of copper cation is present within the range of from about 0.05 to about 0.5 mol per liter.

12. In a method for stabilizing an aqueous plating bath for electrolessly depositing copper upon a substrate, which bath includes in admixture: a source of copper cation, a reducing agent and a complexing agent, the improvement comprising: rendering said bath operable and generally pH-insensitive regardless of the reducing agent through a wide range of pH values between about 4 and about 14, the pH value being selected to be the optimum value for the bath, for the substrate and for a selected one of a variety of reducing agents which is selected from the group consisting of formaldehyde, a hypophosphite compound, a boron-nitrogen compound, a borohydride, and an alkylamine borane by formulating within the electroless copper bath an organophosphorus complexing agent selected from the group consisting of compounds having the general formulas:

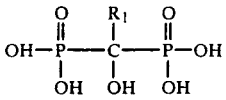

wherein $R_1$ is alkyl having from 1 to 5 carbon atoms, alkali metal and ammonium salts of said compounds, and

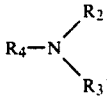

wherein $R_2$ is

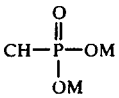

$R_3$ is selected from the class consisting of $R_2$ and $-CH_2CH_2OH$, and $R_4$ is selected from the group consisting of $R_2$, $-CH_2CH_2OH$, and

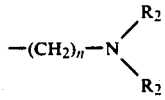

wherein each M is independently selected from the group consisting of H, $NH_4$ and alkali metal, and "n" is an integer from 1 to 6 inclusive; and immersing the substrate within the bath while operating the electroless copper deposition bath at said optimum pH value to maintain optimum deposition conditions for the substrate and for the selected reducing agent.

13. The method of claim 12, wherein such bath has a pH between about 4 and about 6.

14. The method of claim 12, further including a non-ammonium pH regulator to adjust the pH of the bath to between about 12 and about 14 while avoiding the addition of ammonium ions to the bath.

* * * * *